United States Patent [19]
Rohm

[11] Patent Number: 4,759,938
[45] Date of Patent: Jul. 26, 1988

[54] METHOD AND APPARATUS FOR ENHANCED CITRUS JUICE EXTRACTION

[75] Inventor: Robert F. Rohm, Yorba Linda, Calif.

[73] Assignee: Brown International Corporation, Covina, Calif.

[21] Appl. No.: 933,109

[22] Filed: Nov. 21, 1986

[51] Int. Cl.⁴ .............................................. A23N 1/00
[52] U.S. Cl. .................................... 426/481; 99/501; 99/504; 426/489
[58] Field of Search .......... 99/495, 496, 456, 501–505, 99/509, 510; 426/330.5, 599, 479, 489, 481, 518; 198/803.14, 627, 793, 834, 852

[56] References Cited

U.S. PATENT DOCUMENTS

| | | | |
|---|---|---|---|
| 2,631,625 | 3/1953 | Wells | 99/504 |
| 3,796,297 | 3/1974 | Holbrook | 99/504 X |
| 3,858,500 | 1/1975 | Rohm et al. | 99/504 |

*Primary Examiner*—Timothy F. Simone
*Attorney, Agent, or Firm*—Paul A. Weilein

[57] ABSTRACT

A method and apparatus is disclosed for enhanced juice extraction from citrus fruit, the apparatus being of a type including an annular carousel with circumferentially arranged cups, a rotary reamer assembly smaller than the carousel having circumferentially arranged reamer elements arranged in tangential relation with the cups of the carousel at a maximum reaming position, a device for supplying halves of citrus fruit to the cups for processing and for subsequently removing reamed citrus skins, drive dogs being mounted on the reamer assembly between each adjacent pair of reamer elements and shaped so that they radially and circumferentially engage and position the cups in precise alignment with the reamer elements at the maximum reaming position in order to assure optimum extraction of juice from the citrus fruit. The drive dogs also include base surfaces for engaging the cups parallel with the axis of the carousel and reamer assembly for maintaining minimum spacing between the cups and respective reamer elements at the maximum reaming position.

19 Claims, 3 Drawing Sheets

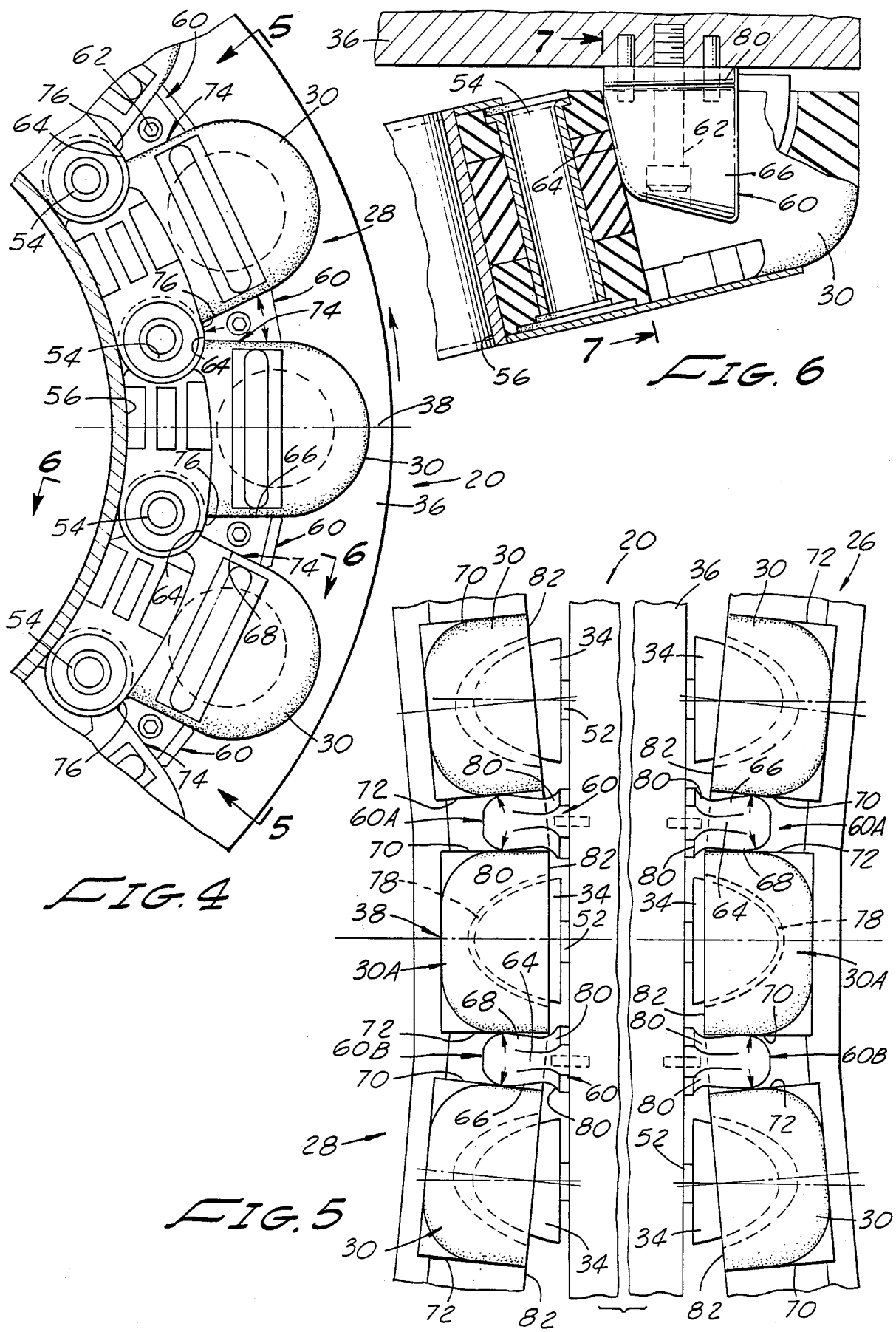

METHOD AND APPARATUS FOR ENHANCED CITRUS JUICE EXTRACTION

FIELD OF THE INVENTION

The present invention relates to a method and apparatus for extracting juice from citrus fruit and more particularly to such a method and apparatus wherein circumferentially arranged cup means on a carousel and circumferentially arranged reamer elements on a rotary reamer assembly enter into nested engagement with each other at a maximum reaming position for reaming or extracting juice from halves of citrus fruit placed therebetween.

BACKGROUND OF THE INVENTION

A variety of machines or apparatus have been developed for extracting juice from citrus fruit or the like. Juice extraction apparatus as contemplated in connection with the present invention is exemplified, for example, by U.S. Pat. No. 2,631,625 issued Mar. 17, 1953 to Wells and assigned to the assignee of the present invention. Juice extraction apparatus disclosed, for example, by this patent included two coextensive continuous conveyor belts carrying opposed pairs of cups arranged in facing relation with each other. The paired cups diverged in the midregion of the conveyors and converged again at the opposite end of the conveyors. A rotary feeder operating on a horizontal axis received new fruit from a side hopper and loaded the fruit into the pairs of cups just before the cups close toward each other. A knife sliced the fruit in the closed pairs of cups at one end of the conveyors. The other end of the two conveyors straddled a reamer assembly rotating on a horizontal axis and having reamer elements projecting from its opposite sides for entering into nested engagement with the cups to ream or extract juice from the citrus fruit halves.

Apparatus of the type briefly described above operated at high speeds with each machine being capable of processing in the range of approximately 600 to 800 citrus fruit per minute.

U.S. Pat. No. 3,796,297 issued Mar. 12, 1974 to Holbrook and also assigned to the assignee of the present invention further disclosed a preferred conveyor of hinged construction for mounting the cups in circumferential relation upon the conveyor assembly or carousel. The hinged conveyor disclosed in this patent has been found to be very satisfactory in achieving accurate alignment between the cups and reamers. Accordingly, the conveyor design of the above patent has been widely employed in juice extractors of the type contemplated by the present invention. In connection with the present invention, it is noted that the conveyor of the above patent provided very good alignment when all parts are new. However, as with all such machinery, alignment tended to get progressively worse as various parts experienced wear within the apparatus. Accordingly, there has been a long recognized need for improving such conveyor apparatus particularly to eliminate high wear points tending to reduce accurate alignment between the cups and reamers.

U.S. Pat. No. 4,421,021 issued Dec. 20, 1983 to Holbrook and also assigned to the assignee of the present invention is further illustrative of the prior art in this regard since it combined the hinged conveyor of the patent noted immediately above with the conveyor construction of the wells patent first noted above.

Rohm et al U.S. Pat. No. 3,858,500 issued Jan. 7, 1975 was illustrative of an attempt to minimize a backlash between the rotary reamer assembly and annular conveyor carousel in apparatus of the type disclosed above for further developing or maintaining desired alignment between the reamer elements and cups. For this purpose, individual forked elements were provided to engage pins on the respective cups at a maximum reaming position for the purpose noted above of minimizing backlash between the rotary reamer assembly and annular carousel. The forked elements of the above patent accomplished this purpose in that they did minimize backlash. However, they did not eliminate backlash between the cups and reamers. Furthermore, components in this design continue to be subject to extensive wear, again resulting in diminished alignment between the cups and reamer elements as noted above.

Accordingly, there has been found to remain a need for improvements in the design of such juice extraction apparatus for the purpose of achieving and maintaining proper alignment between the cups and reamer elements during extended operation of the juice extracting machinery. This need has been further recognized with the realization that the quality of citrus juice can be further improved by maintaining low oil content in the juice. However, in addition to minimizing oil extraction from the citrus fruit halves, it is also, of course, important to achieve maximum or optimum extraction of juice from the fruit for obvious reasons. In any event, it is thus even more important to assure proper alignment and nested engagement between the cups and reamer elements during continued operation of the juice extraction machinery.

SUMMARY OF THE INVENTION

It is therefore an object of the invention to provide an improved method and apparatus for extracting juice from citrus fruit and the like. More particularly, it is an object of the invention to employ apparatus of the type referred to above wherein cups and reamer elements are arranged on different rotating assemblies for entering into nested engagement in a maximum reaming position for extracting juice from the citrus fruit.

It is a further object of the invention to provide a method and apparatus for extracting juice from citrus fruit and the like while employing apparatus as referred to above wherein drive dogs are positioned and shaped to positively engage both sides of the respective cup means in order to precisely position the cup means both radially and circumferentially with respect to the reamer elements at the maximum reaming position in order to assure optimum extraction of juice from the oitrus fruit.

It is a further related object of the present invention to provide such a method and apparatus wherein the drive dogs are also provided with base means or surfaces which axially engage the cup means in order to maintain minimum spacing between the cup means and respective elements at the maximum reaming position.

It is yet another related object of the invention to provide such a method and apparatus wherein the cup means are formed from elastomeric material and the drive dogs are formed from hardened metal in order to minimize wear and achieve proper alignment between the cup means and reamer elements over extended operation of the apparatus.

It is yet another object of the invention to provide such a method and apparatus wherein the drive dogs are provided with lateral surfaces and end surfaces for engaging and positioning the cup means both radially and circumferentially. Preferably, the lateral surfaces and end surfaces as well as the base surfaces are curved or rounded to further facilitate engagement and disengagement with cup means in order to further enhance alignment of the cup means and reamer elements and to further assure elimination of backlash as referred to above.

Additional objects and advantages of the invention are made apparent in the following description having reference to the accompanying drawings.

BRIEF DESCRIPTION OF THE DRAWINGS

Referring to the accompanying drawings, which are provided for illustrative purposes only:

FIG. 4 is similarly an enlarged fragmentary view taken along line 4—4 of FIG. 3;

FIGS. 5 and 6 are also enlarged, fragmentary views taken respectively along section lines 5—5 and 6—6 of FIG. 4 for better illustrating features of the invention;

DESCRIPTION OF THE PREFERRED EMBODIMENT

Figure 1:
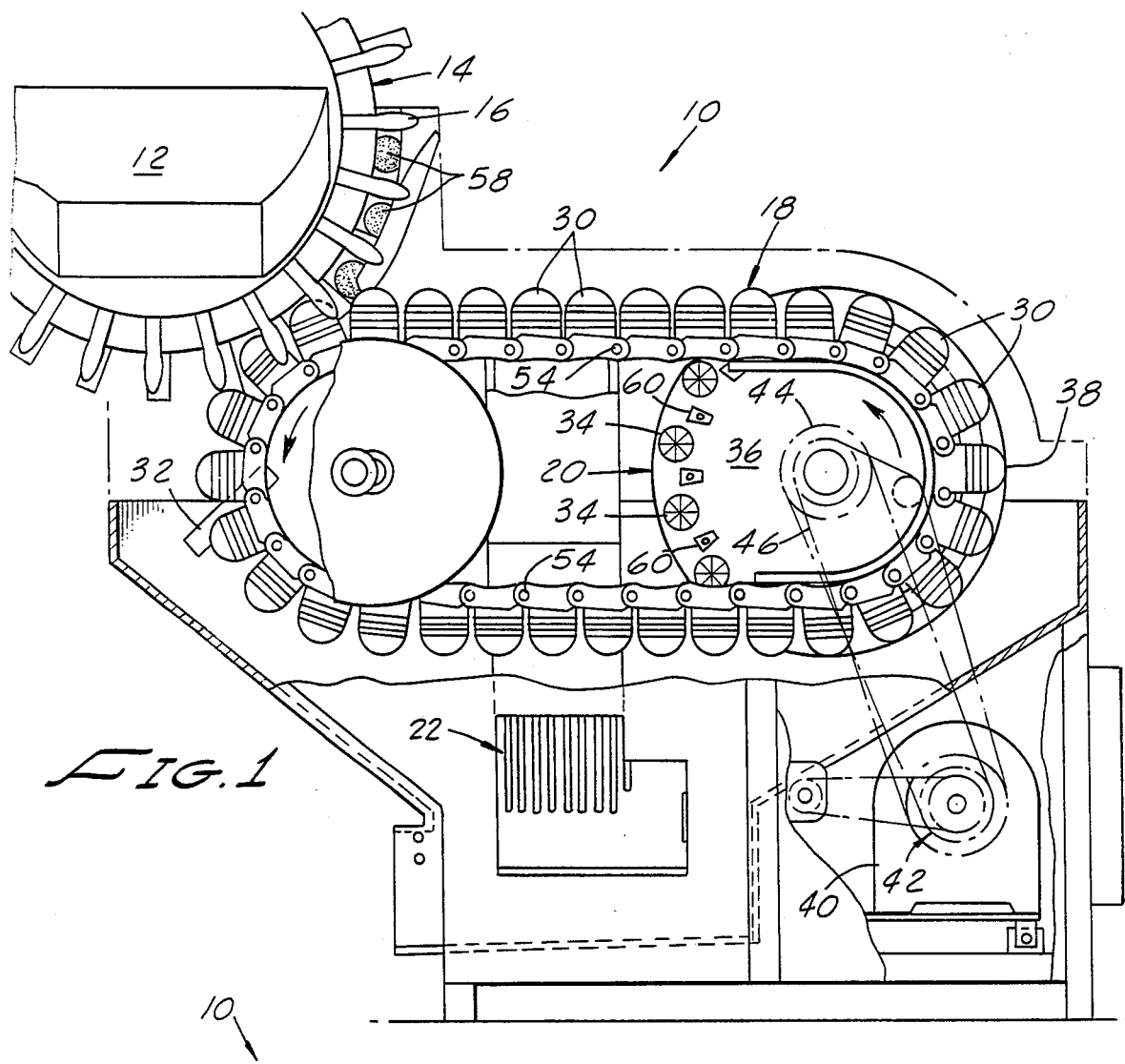
FIG. 1 is a side elevation view of citrus juice extraction apparatus for machinery embodying features of the present invention, portions of the apparatus being broken away to further illustrate important details of construction.
Figure 2:
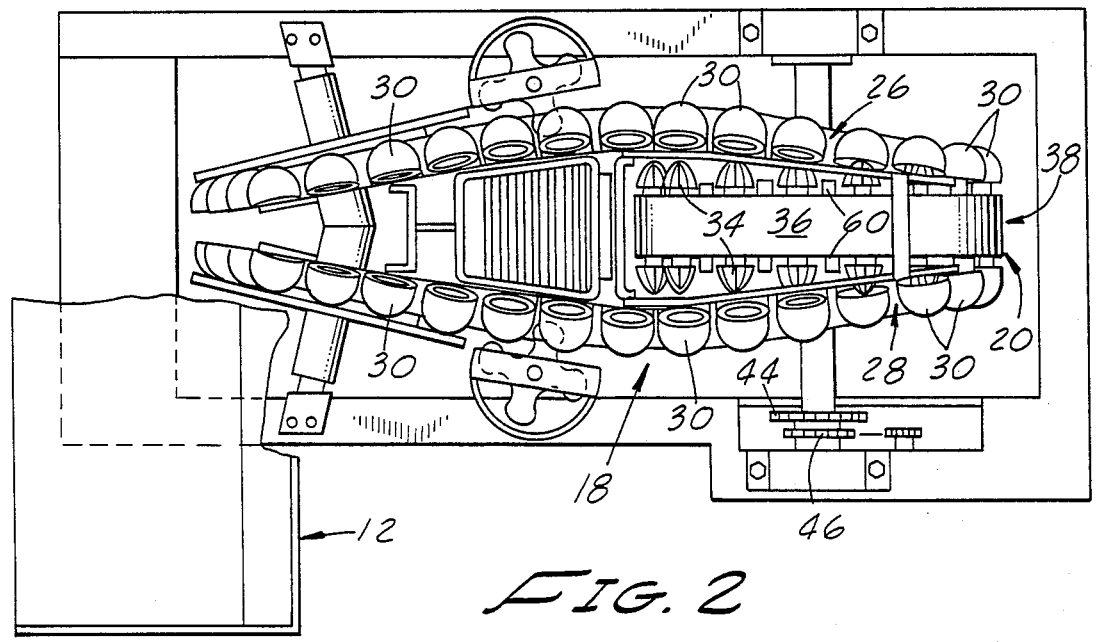
FIG. 2 is a top plan view of the juice extraction apparatus or machinery of FIG. 1, portions also being broken away to better illustrate the interaction between cups and reamer elements as noted above and described in greater detail below.
Figure 3:
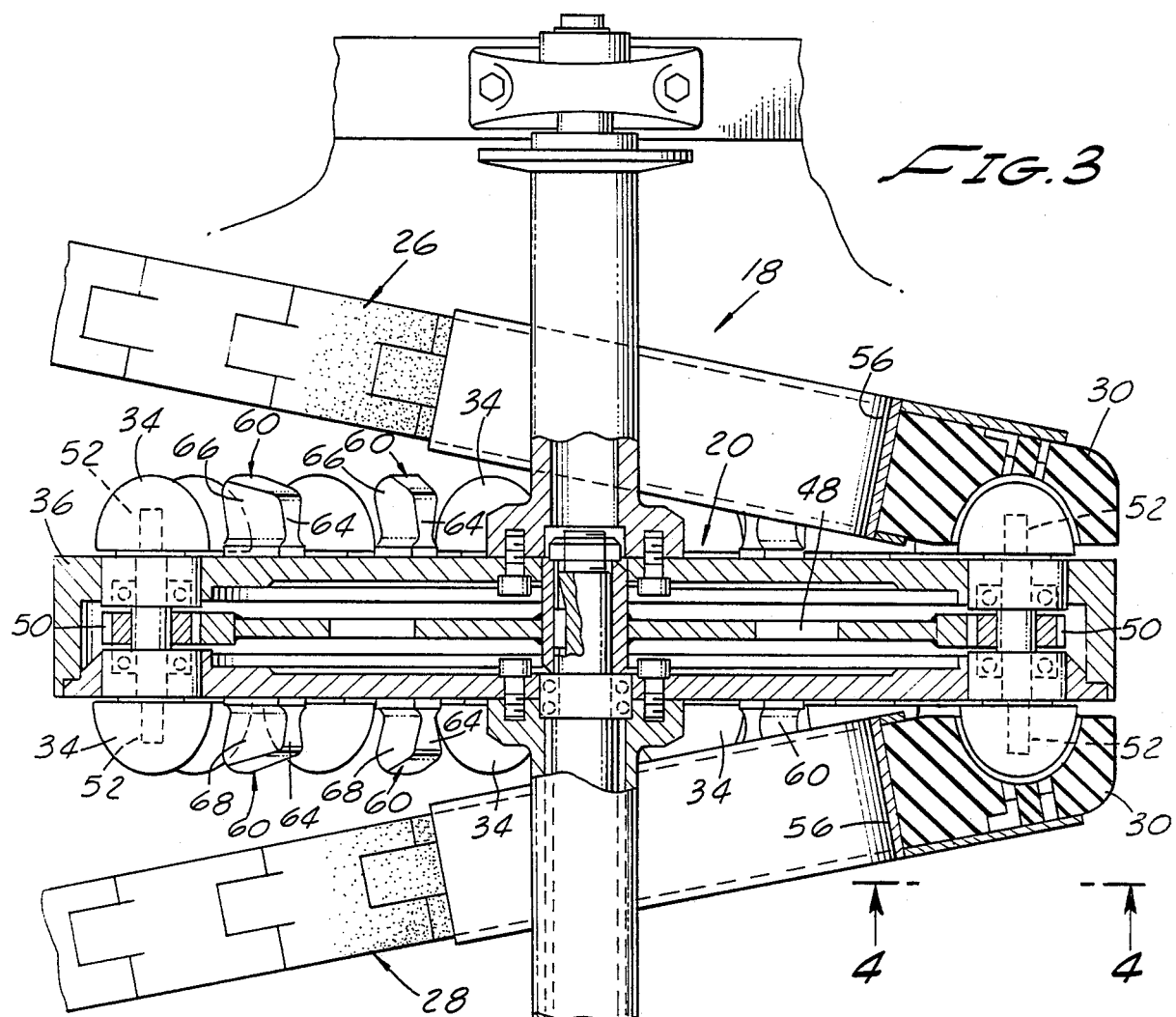
FIG. 3 is an enlarged fragmentary view of a maximum reaming position at the right hand of the apparatus illustrated in FIG. 2 in order to better illustrate construction of particular features embodied in the present invention.

Referring now to the drawings, the present invention is illustrated as being embodied within a juice extractor of the type generally indicated at 10 in FIGS. 1 and 2. Referring to those figures, citrus fruit is delivered to the juice extractor 10 from a supply hopper 12 by means of a vertically arranged, rotating feed wheel 14 having circumferentially spaced peripheral radial blades 16 which successively feed whole citrus fruit to a cup-chain conveyor mechanism, generally indicated at 18. Generally, the fruit received by the chain conveyor mechanism 18 are cut into halves which are then conducted to a reamer mechanism 20 for having juice extracted therefrom. After the juice is extracted, the peels or skins from the citrus fruit are then ejected into a chute 22 by which they exit from the apparatus 10.

The fruit extraction apparatus also includes a grid structure (not shown) for separating various components such as the peels or skins, pulp, rag and contaminants from juice extracted from the citrus fruit. The grid structure is shown and described in detail in U.S. Pat. No. 4,421,021.

Various components of the apparatus 10, as summarized above, are described in greater detail within one or more of the patents noted above. Accordingly, those patents are incorporated herein as though set forth in full to assure a complete understanding of the juice extraction apparatus 10 of FIGS. 1 and 2.

Generally, the conveyor mechanism 18 comprises a pair of conveyors or carousels 26 and 28 which carry respective series of elastomeric cups 30 paired with each other in facing relation. The cups 30 on the respective conveyors 26 and 28 are in confronting relation and are arranged so that upon rotation of the conveyors or carousels, the cups engage and hold citrus fruit as they are successively delivered from the feed wheel 14. Each piece of fruit held between respective pairs of cups passes a slicing knife 32 which severs each fruit into halves or sections secured in the respective cups.

The conveyors or carousels 26 and 28 continue in operation with the facing cups 30 moving in converging paths in order to bring the out faces of the fruit halves into engagement with rotary reamer elements 34 arranged on the opposite sides of a cylindrical rotatably mounted head or reamer assembly 36.

It may be best seen in FIG. 2, at the right side thereof, that the cups 30 converge into fully nested relation with the respective reamer elements 34 at a maximum reaming position generally indicated at 38. As the halves of fruit are carried by the cups past the position 38, the reamer elements 34 enter into nested engagement with the respective cups 30 in order to ream or extract juice and associated components such as rag, seeds, etc., from the fruit halves.

The construction of the apparatus 10 as described above is generally known from prior art including the patents noted above and incorporated by reference. Accordingly, no further discussion as to the general operation of the juice extraction apparatus 10 is believed necessary. Hoywever, it is noted with further reference to FIGS. 1 and 2 that both the reamer assembly 36 and cup conveyors or caoursels 26 and 28 are driven by a gearmotor 40 operating, for example, at approximately 100 rpm. An output shaft and sprocket assembly 42 is separately coupled with drive sprockets 44 and 46. The sprocket ratio established by the sprocket assembly 42 and drive sprockets 44 and 46 is selected to assure proper operation as described below.

The drive sprocket 44 is connected directly to the reamer head or assembly 36 in order to drive the reamer elements 34 in rotation upon the assembly 36. The other drive sprocket 46 engages a bull gear 48 arranged inside the reamer assembly 36 and in engagement with pinion gears 50. The reamer elements 34 are mounted on pinion shafts 52 which are driven by the pinion gears 50 in order to drive the reamer elements in rotation about their respective axes.

The number of reamer elements and associated pinion shafts 52 typically employed on the reamer assembly 36 can vary depending upon the size of fruit and/or the size of the cups 30.

The cups 30 are interconnected with each other in hinged relation as described in greater detail within U.S. Pat. No. 2,631,625 referred to above. In any event, the cups are pivotably interconnected by means of bushings 54 (see FIG. 4) which allow the individual cups 30 to pivot as they are carried by the conveyors or carousels 26 and 28.

Stationary cup tracks 56 are designed and mounted upon the apparatus 10 to guide or direct the individual cups 30 around the reamer head assembly 36 so that the reamer elements 34 gradually enter into nested engagement with the cups 30 at the maximum reaming position 38 and then gradually separate from the cups as the reamer elements 34 and cups 30 are moved away from the maximum reaming position. As illustrated in FIG. 2, the cups 30 and reamer elements 34 travel along respective paths as they approach and leave the maximum reaming position 38 at an angle of approximately 13° with respect to each other.

Because of the construction as set forth above, some movement is possible in the individual cups 30, with respect to the reamer elements 34, particularly after some wear is experienced within the apparatus 10. The present invention is particularly concerned with precisely positioning the individual cups 30 relative to the respective reamer elements 34 and particularly at the maximum reaming position 38 in a manner for precisely determining the relative positioning of the cups and reamer elements in order to assure optimum extraction of juice and other components from the citrus fruit halves.

Citrus fruit processed in the apparatus 10 is generally indicated at 58 in FIG. 1. However, the citrus fruit is not illustrated in position in the cups 30 or between the cups and reamer elements in order to better illustrate construction of the apparatus 10 in accordance with the present invention.

As noted above, the present invention is particularly concerned with precisely controlling relative positioning of the individual cups 30 relative to the respective reamer elements 34 and particularly at the maximum reaming position 38. For that purpose, drive dogs 60 are respectively mounted on the reamer assembly 36 by means of bolts 62 as best illustrated in exploded relation in FIG. 8. Referring generally to FIGS. 3–7, it may be seen that the respective drive dogs 60 are mounted between each pair of reamer elements 34 so that a pair of the drive dogs 60, arranged on opposite sides of any selected reamer element 34, enter into engagement with opposite sides of a respective cup 30 as the particular reamer element 34 and cup 30 approach the maximum reaming position 38.

Figure 8:
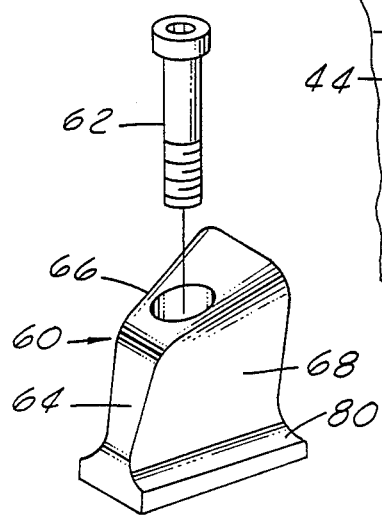
FIG. 8 is a perspective view of one of the drive dogs to better illustrate the manner in which they are shaped in accordance with the present invention.
Figure 7:
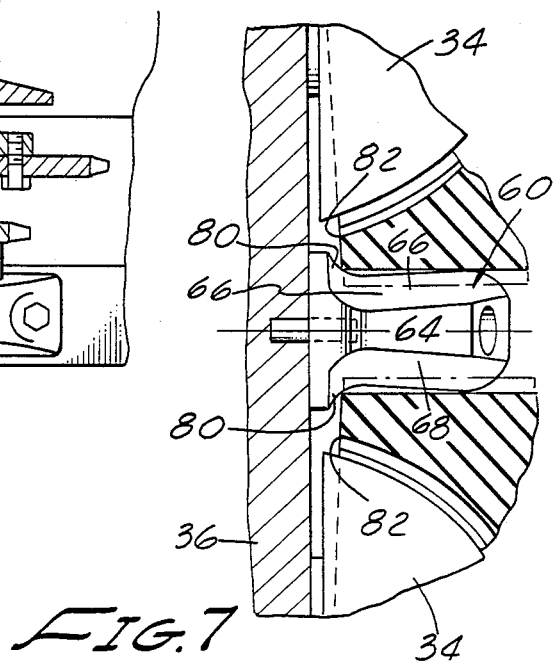
FIG. 7 is a further enlarged, fragmentary view taken along section line 7—7 in FIG. 6 to illustrate interaction between drive dogs of the invention and hinged cups on the cup conveyor or carousel.

Referring particularly to FIG. 8, each of the drive dogs is formed with an end surface 64 and lateral surfaces 66 and 68 which converge toward each other as they approach the and surface 64 in order to provide each drive dog 60 with a wedge-shaped configuration as viewed, for example, in FIG. 4.

Referring to FIGS. 4–6, adjacent pairs of cups 30 are formed with surfaces 70 and 72 which extend outwardly from a respective pivot bushing 54. Accordingly, as a selected cup 30 approaches the maximum reaming position 38, while being supported by a stationary cup track 56, the surfaces 70 and 72 on adjacent cups 30 separate from each other in order to form V-shaped openings 74 while they are adjacent the maximum reaming position 38.

The wedge configuration of the drive dogs 60 is selected to conform to the V-shaped openings 74 at the maximum reaming position 38 so that the end surface 64 of each drive dog 60 engages a root surface 76 in the respective V-shaped opening 74 while the lateral surfaces 66 and 68 simultaneously engage the respective cup surfaces 70 and 72.

Continuing with reference to FIGS. 4–6, it may thus be seen that two drive dogs 60, generally indicated at 60A and 60B thus engage a single cup 30, indicated at 30A. Thus, the two drive dogs 60A and 60B act on the single cup 30A to position it both radially (with respect to the stationary cup tracks 56) and circumferentially or along the path of travel indicated for the cups 30.

Since the drive dogs 60 are precisely located on the reamer assembly 36 with respect to the reamer elements 34, they thus serve to precisely position each individual cup 30 relative to a respective reamer element 34. In this manner, the nested relation between the respective cups 30 and reamer elements 34, as may possibly be best seen in FIG. 5, is precisely regulated in order to establish a space 78 therebetween selected for achieving optimum extraction of juice and other components from the citrus fruit while allowing only a minimum amount of oil to be separated from the fruit with the juice.

At the same time, the drive dogs 60 are also formed with base means or surfaces 80 which are further provided to limit travel of the individual cups 30 toward the respective reamer elements 34 in order to further enhance the quality of juice extracted from the citrus fruit. In this regard, the base surfaces 80 are formed adjacent the lateral surfaces 66 and 68 of each drive dog while being positioned for engaging a lower edge 82 of each respective cup 30. It may thus be seen that the base surfaces 80 act against the lower edges 82 of the cups 30 in a direction parallel with the axes of the carousels 26 and 28 as well as the reamer assembly 36. In any event, each individual cup 30 is limited in its travel toward a respective reamer element 34 at the maximum reaming position 38 by the base surfaces 80. Thus, the drive dogs 60 not only serve to position the cups radially and circumferentially, but also axially as defined above in order to precisely define the nested engagement between the cups and reamer elements.

As may be best seen in FIG. 8, all of the surfaces 64, 66, 68 and 80 on the drive dogs 60 are rounded or curved in order to facilitate their engagement and disengagement with the respective cups 30 in order to completely eliminate backlash between the cups 30 and reamer elements 34 as they are respectively carried by the carousels 26 and 28 and the reamer assembly 36.

Furthermore, the cups 30 are formed from elastomeric material having some tendency to yield. Preferably, the drive dogs 60 are formed from hardened metal such as stainless steel which is also preferably polished on all of the surfaces referred to above in order to minimize friction upon engagement between the cups and drive dogs. Thus, minimum wear is experienced in both the drive dogs and associated surfaces of the cups 30 in order to assure precise positioning of the cups 30 over extended operation of the apparatus 10.

The method of operation for the apparatus 10 is believed to be fairly apparent from the preceding description. However, the method of operation, at least with respect to the drive dogs 60, is briefly described below in order to assure a complete understanding of the invention. As the carousels 26, 28 and the reamer assembly 36 are driven in conventional operation as described above, the drive dogs 60 are positioned on the reamer assembly between each adjacent pair of reamer elements 34 as noted above.

The positioning and shape of the drive dogs 60 is selected so that they precisely enter into engagement with both the root surface 76 and adjacent cup surfaces 70 and 72 formed in each V-shaped opening 74 between adjacent cups as the cups approach and pass through the maximum reaming position 38. Thus, each cup 30 is positioned both radially and circumferentially as well as axially by drive dogs positioned adjacent each reamer element 34.

Thus, precise alignment is assured between the cups 30 and respective reamer element 34 as they approach and pass through the maximum reaming position 38 in order to assure optimum juice extraction as noted above. Formation of the cups from elastomeric material and formation of the drive dogs from hardened and preferably polished metal, further assures minimum wear in those components so that the precise positioning provided for the cups 30 is ensured over long periods of operation for the apparatus 10.

Accordingly, there has been described a preferred method of operation and apparatus for enhanced juice extraction from citrus fruit and the like. Numerous variations and modifications are, of course, possible in addition to those specifically referred to above. Accordingly, the scope of the present invention is defined only by the following appended claims.

What is claimed is:

1. Improved apparatus for extracting juice from citrus fruit, the apparatus including an annular carousel having a circumferential series of cup means to hold halves of citrus fruit, a rotary reamer assembly of a diameter sustantially smaller than the annular carousel, the reamer assembly being positioned in tangential relation with a circumferential region of the annular carousel at a maximum reaming position, and the reamer assembly having a circumferential series of radially positioned reamer elements synchronized with the carousel and relatively affixed on the reamer assembly for respectively entering into nested relation with the cup means at the maximum reaming position, the cup means being interconnected in hinged relation so that they form V-shaped openings on opposite sides of each cup means as it approaches the maximum reaming position, the improvement comprising: drive dogs mounted on the reamer assembly between each adjacent pair of reamer elements, the drive dogs being positioned on the reamer assembly and wedge shaped with end surfaces and lateral surfaces for engaging the respective cup means radially and circumferentially so that a pair of drive dogs on opposite sides of each reamer element approaching the maximum reaming position positively engage a respective cup means in order to precisely position the cup means with respect to the reamer element at the maximum reaming position in order to assure optimum extraction of juice from the citrus fruit.

2. The improved juice extraction apparatus of claim 1 wherein each of the drive dogs is formed with base means for engaging the cup means axially with respect to the annular carousel in order to maintain minimum spacing between the cup means and respective reamer element at the maximum reaming position.

3. The improved juice extraction apparatus of claim 1 wherein the cup means are formed from elastomeric material and the drive dogs are formed from hardened metal.

4. The improved juice extraction apparatus of claim 1 wherein the end surfaces and lateral surfaces are rounded for facilitating engagement and disengagement with the cup means.

5. The improved juice extraction apparatus of claim 4 wherein each of the drive dogs is formed with base means for engaging the cup means axially with respect to the annular carousel in order to maintain minimum spacing between the cup means and respective reamer element at the maximum reaming position.

6. The improved juice extraction apparatus of claim 5 wherein the base means of the drive dogs are also rounded for facilitating engagement and disengagement with the cup means.

7. The improved juice extraction apparatus of claim 5 wherein the base means comprise flange surfaces which taper into the lateral surfaces of the drive dogs.

8. A drive dog for positioning in plurality on apparatus for extracting juice from citrus fruit, the apparatus including an annular carousel having a circumferential series of cup means to hold halves of citrus fruit, a rotary reamer assembly of a diameter substantially smaller than the annular carousel, the reamer assembly being positioned in tangential relation with a circumferential region of the annular carousel at a maximum reaming position, and the reamer assembly having a circumferential series of radially positioned reamer elements synchronized with the carousel and relatively affixed on the reamer assembly for respectively entering into nested relation with the cup means at the maximum reaming position, the cup means being interconnected in hinged relation so that they form V-shaped openings on opposite sides of each cup means as it approaches the maximum reaming position, the drive dogs being wedge shaped with end surfaces and lateral surfaces for engaging the respective cup means radially and circumferentially so that a pair of drive dogs on opposite sides of said reamer elements approaching the maximum reaming position positively engage a respective cup means in order to precisely position the cup means with respect to the reamer element at the maximum reaming position in order to assure optimum extraction of juice from the citrus fruit.

9. The drive dog of claim 8 wherein each of the drive dogs is formed with base means for engaging the cup means axially with respect to the annular carousel in order to maintain minimum spacing between the cup means and respective reamer element at the maximum reaming position.

10. The drive dog of claim 8 wherein the cup means are formed from elastomeric material and the drive dogs are formed from hardened metal.

11. The drive dog of claim 8 wherein the end surfaces and lateral surfaces are rounded for facilitating engagement and disengagement with the cup means.

12. The drive dog of claim 11 wherein each of the drive dogs is formed with base means for engaging the cup means axially with respect to the annular carousel in order to maintain minimum spacing between the cup means and respective reamer element at the maximum reaming position.

13. The drive dog of claim 12 wherein the base means of the drive dogs are also rounded for facilitating engagement and disengagement with the cup means.

14. The drive dog of claim 12 wherein the base means comprise flange surfaces which taper into the lateral surfaces of the drive dogs.

15. A method of operating apparatus for extracting juice from citrus fruit, the apparatus including an annular carousel having a circumferential series of cup means to hold halves of citrus fruit, a rotary reamer assembly of a diameter substantially smaller than the annular carousel, the reamer assembly being positioned in tangential relation with a circumferential region of the annular carousel at a maximum reaming position, the reamer assembly having a circumferential series of radially positioned reamer elements synchronized with the carousel and relatively affixed on the reamer assembly for respectively entering into nested relation with the cup means at the maximum reaming position, the cup means being interconnected in hinged relation so that they form V-shaped openings on opposite sides of each cup means as it approaches the maximum reaming position, comprising the steps of:

providing the cup means with halves of citrus fruit for processing, driving the carousel and rotary reamer assembly in operation for extracting juice from the citrus fruit halves, employing drive dogs on the reamer assembly between each adjacent pair of reamer elements during the extraction process and positioning the drive dogs on the reamer assembly and forming the drive dogs with a wedge shape including end surfaces and lateral surfaces for engaging the respective cup means radially and circumferentially so that a pair of drive dogs on opposite sides of each reamer element approaching the maximum reaming position positively engage a respective cup means in order to precisely position the cup means with respect to the reamer element at the maximum reaming position in order to assure optimum extraction of juice from the citrus fruit, and subsequently removing reamed citrus skins from the cup means.

16. The method of claim 15 wherein each of the drive dogs is formed with base means for engaging the cup means axially with respect to the annular carousel in order to maintain minimum spacing between the cup means and respective reamer element at the maximum reaming position.

17. The method of claim 15 wherein the end surfaces and lateral surfaces are rounded for facilitating engagement and disengagement with the cup means.

18. The method of claim 17 wherein the base means of the drive dogs are also rounded for facilitating engagement and disengagement with the cup means.

19. The method of claim 16 wherein the base means comprises flange surfaces which taper into the lateral surfaces of the drive dogs.

\* \* \* \* \*